J. FELDMAN.
BUTCHER'S SCALE PAN.
APPLICATION FILED MAR. 17, 1909.
944,777.
Patented Dec. 28, 1909.
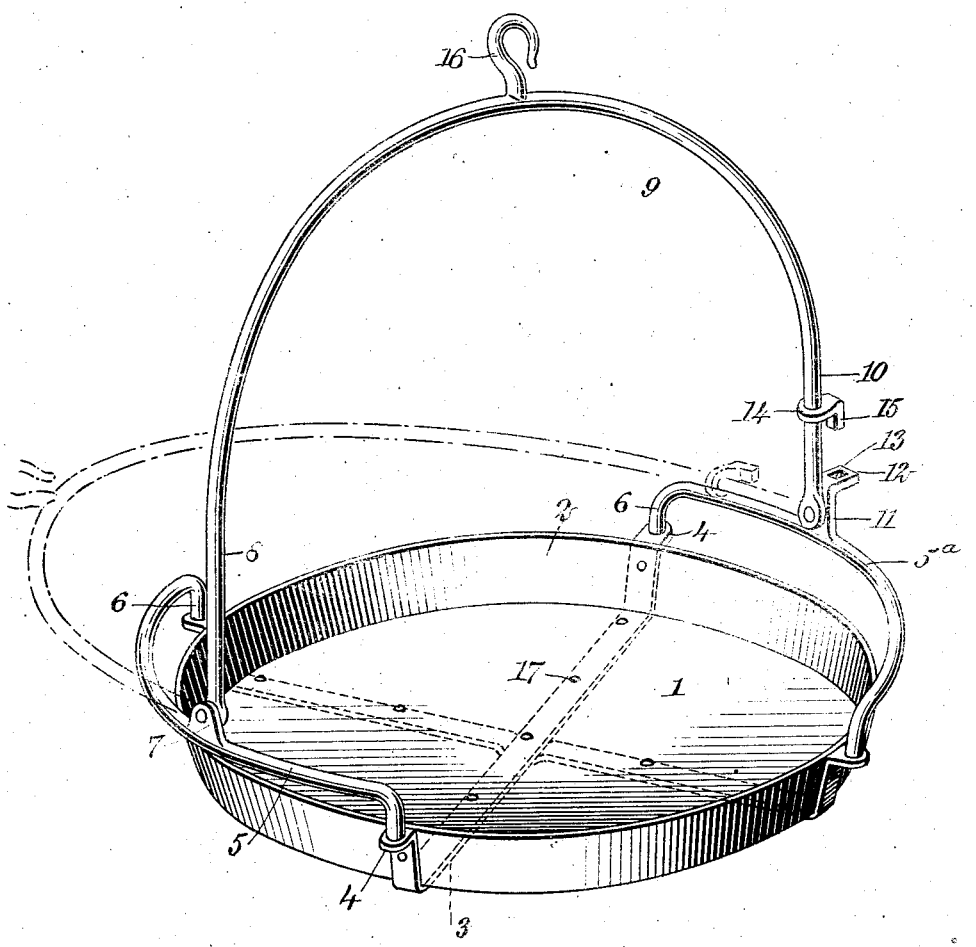
WITNESSES
Edward Thorpe
F. D. Ammen
INVENTOR
Jacob Feldman
BY Munn & Co.
ATTORNEYS

UNITED STATES PATENT OFFICE.

JACOB FELDMAN, OF NEW YORK, N. Y.

BUTCHER'S SCALE-PAN.

944,777. Specification of Letters Patent. Patented Dec. 28, 1909.

Application filed March 17, 1909. Serial No. 483,883.

*To all whom it may concern:*

Be it known that I, JACOB FELDMAN, a subject of the Czar of Russia, and a resident of the city of New York, borough of Brooklyn, in the county of Kings and State of New York, have invented a new and Improved Butcher's Scale-Pan, of which the following is a full, clear, and exact description.

This invention relates to scale pans such as used by butchers in weighing meat. These pans are of very large diameter and are usually provided with a rigid bail which extends upwardly in the form of a yoke, the ends of which are attached at opposite sides of the pan. This yoke is also of large dimensions, and the fact that it is rigidly attached to the pan renders it inconvenient to put the pan out of the way when not in use.

An object of this invention is to provide a pan of this class having a pivoted bail provided with improved means for locking the bail rigidly in its upright position; the locking device is constructed so that it can be readily disengaged to enable the bail to be folded down upon the pan nearly in the plane of the pan. When the bail is folded in this manner the pan can be readily set against the wall and will occupy very little space.

A further object of the invention is to improve the general structure of the pan.

The invention consists in the construction and combination of parts to be more fully described hereinafter and particularly set forth in the claims.

Reference is to be had to the accompanying drawing forming a part of this specification, in which the figure is a perspective of a pan having a bail constructed according to my invention, and illustrating the locking device, this view showing the bail in its folded position in dotted lines.

Referring more particularly to the parts, 1 represents the body of the pan which is of large diameter presenting a narrow flange or rim 2. Across the bottom of the pan I provide diametrically disposed straps or bars 3, and at their extremities these bars turn upwardly and are attached to the rim 2, as indicated. The ends of the straps are provided with outwardly projecting ears 4 which are disposed in a substantially horizontal plane. To these ears 4, handles or side rails 5 and 5ᵃ are rigidly attached on opposite sides of the ears. These rails are simply bent bars which curve so as to conform to the general outline of the pan, and their extremities have downwardly bent shanks 6 which fasten in the ears 4, as shown. The handle 5 is provided at its middle point with an upwardly extending ear 7, and to this ear one of the forks 8 of the bail 9 is pivotally attached, as shown. The other fork 10 of the bail is pivotally attached to an upwardly extending ear 11 which is formed on the bar 5ᵃ at its middle point. This ear 11 is diametrically opposite to the ear 7. The upper end of the ear 11 is bent outwardly so as to form a fin 12, and this fin is provided with an angular opening 13 which extends downwardly through it, as indicated.

On the fork 10 of the bail, a locking ring 14 is mounted to slide freely. On its outer side this ring is provided with a downwardly projecting finger 15 which is adapted to be received in the opening 13, as will be readily understood. When in this position the ring 14 will evidently lock the bail 9 rigidly to the pan so that the pan can support the meat without turning over. The upper part of the bail 9 is provided with a hook 16 by means of which the pan may be supported on the scale. When the pan is to be set to one side, the locking ring 14 will be raised in the manner indicated in the drawing, so as to disengage the finger 15 from the fin 12. When this has been done, the bail may be folded down into a horizontal position, as indicated by the dotted outline. The bail will then lie nearly in the plane of the pan, and the pan will then occupy very little space.

The straps 3 which pass under the bottom of the pan are rigidly attached to it by rivets 17, as indicated, and form a reinforcement for the pan body as well as affording means for attaching the side bars 5 and 5ᵃ.

Having thus described my invention, what I claim as new and desire to secure by Letters Patent,—

1. A pan, a bail in the form of a bow pivotally connected at its ends to said pan, and adapted to swing on a diametric axis of said pan, an outwardly projecting fin adjacent to the pivot point of said bail, and a locking ring sliding on said bail and having a finger adapted to engage said fin to lock said bail rigidly with respect to said pan.

2. A pan presenting upwardly projecting ears diametrically opposite to each other, a bail having forks pivotally attached to said ears on the diameter of said pan as an axis, one of said ears having an outwardly projecting fin with an opening therein, and a sliding ring mounted on the fork adjacent to said fin and having a finger adapted to be received in said opening.

3. A pan, curved rails rigidly attached to said pan on opposite sides thereof, a bail having forks pivotally attached to said rails, one of said rails having a laterally disposed projecting member, and a sliding ring mounted on the fork adjacent to said projecting member and adapted to engage the same to lock said bail rigidly with respect to said pan.

4. A pan, a pair of straps disposed diametrically across the bottom thereof and having ears formed at the edges of said pan, rails attached to said ears on opposite sides of said pan, a bail having forks pivotally attached to said rails, and means mounted on one of said forks for rigidly locking said bail to one of said rails.

In testimony whereof I have signed my name to this specification in the presence of two subscribing witnesses.

JACOB FELDMAN

Witnesses:
EVERARD B. MARSHALL,
F. D. AMMEN.